PATENTED JUNE 4, 1832.
7103X
A. BACON.
MILL.
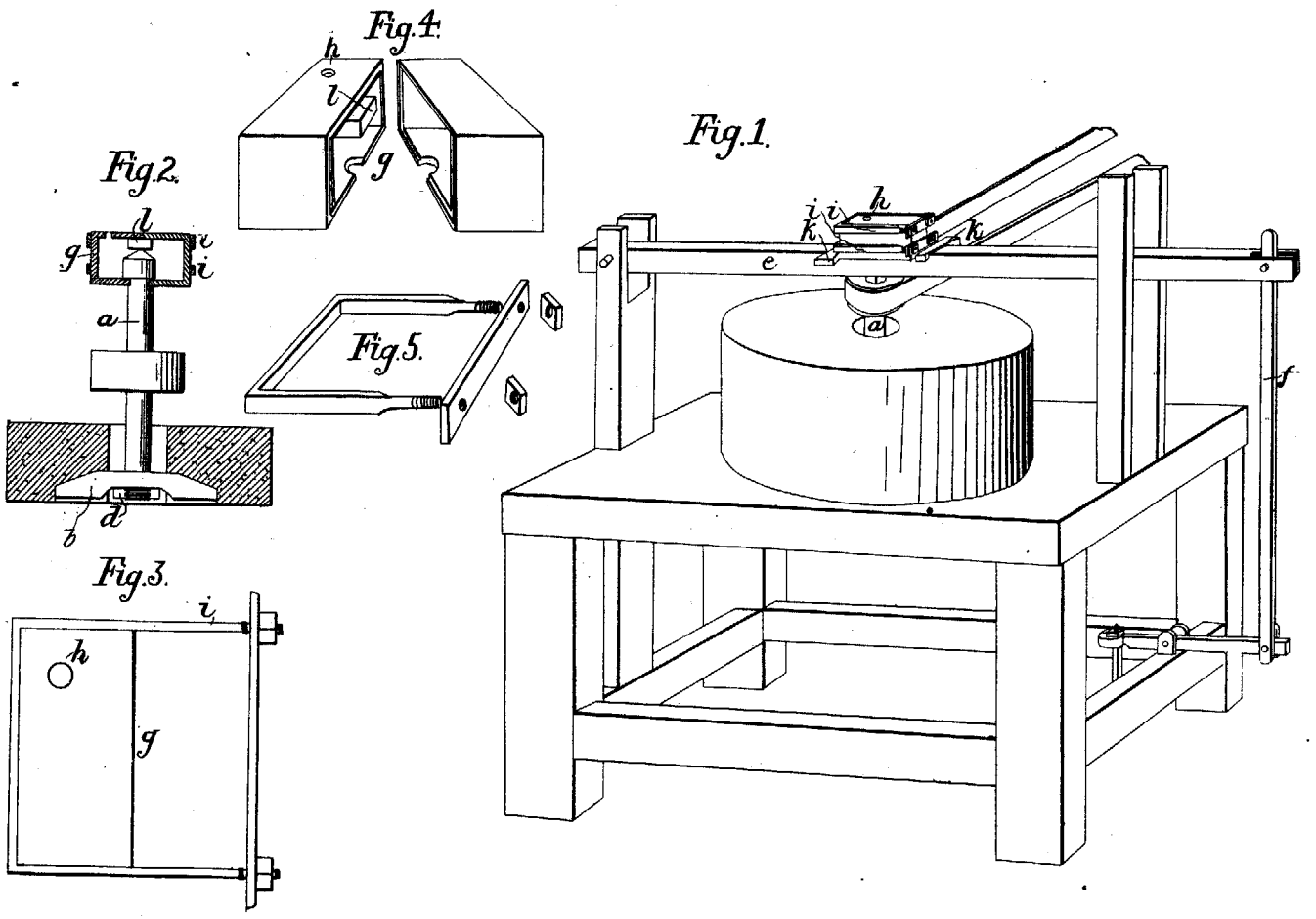

7103X

Ar 15
June 4. 1832

Asahel Bacon
Letters Patent

The Schedule referred to in these Letters Patent and making part of
the same containing a description in the words of the said Asahel Bacon
himself of his improvement in Mills for grinding grain

---

Be it known that I Asahel Bacon of Windsor Broome County State of
New York have made an improvement in Mills for grinding grain which is
described as follows. The frame the Stones the Hopper and shoe are the same as
in other mills. the improvement consists in suspending the upper stone or run-
ner from an iron vessel containing oil on the top of the spindle & in placing
the bridge tree above the stones. The spindle passes thro' the rind or driver & is
fastened by a screw & nut below by which means the stone or runner is suspend-
ed from the bridge tree & properly balanced. The bridge tree is placed above
the stones & raised or lowered by a lever placed on the frame. A Box made of
iron is placed on the spindle & a cavity is made in the lower part of it to admit
the head of the spindle. this is effected by making the bottom of the box in two
parts and leaving a round opening in the parts for the spindle and then bring-
ing the parts together below the head of the Spindle & binding them by bands or
a strap of iron thus forming the box or oil pot. An opening is made in the top to
pour in oil and a box is put inside of the oil pot against which the head of the
spindle turns. The box is secured in the bridge tree by dove tail mortice and keys
The invention here claimed and desired to be secured by Letters Patent is the
mode of suspending the runner or upper stone from the Box or oil pot formed
on the top of the spindle secured to the bridge tree above the stones and passing
the spindle thro' the driver secured below by a screw and nut. For a further
illustration of my Invention I refer to the model and drawings of the same
deposited in the Patent Office. In witness whereof I have hereunto subscribed
my name this 31st day of May 1832.

Witnesses
Wm. P. Elliot
Wm. G. Cranch

Asahel Bacon